(12) United States Patent
Everest

(10) Patent No.: US 12,499,350 B1
(45) Date of Patent: Dec. 16, 2025

(54) APPARATUS AND METHOD FOR PERSONALIZATION OF EDUCATIONAL MACHINE LEARNING MODELS

(71) Applicant: edYou Technologies Inc., Los Angeles, CA (US)

(72) Inventor: Michael Everest, Los Angeles, CA (US)

(73) Assignee: edYou Technologies Inc., Los Angeles, CA (US)

( * ) Notice: Subject to any disclaimer, the term of this patent is extended or adjusted under 35 U.S.C. 154(b) by 0 days.

(21) Appl. No.: 19/044,532

(22) Filed: Feb. 3, 2025

(51) Int. Cl.
```
G06N 3/00      (2023.01)
G06F 40/279    (2020.01)
G06F 40/40     (2020.01)
G06N 3/0455    (2023.01)
G06N 3/0985    (2023.01)
```

(52) U.S. Cl.
CPC ......... *G06N 3/0455* (2023.01); *G06F 40/279* (2020.01); *G06F 40/40* (2020.01); *G06N 3/0985* (2023.01)

(58) Field of Classification Search
CPC .. G06N 3/0455; G06N 3/0985; G06F 40/279; G06F 40/40
See application file for complete search history.

(56) References Cited

U.S. PATENT DOCUMENTS

| | | | |
|---|---|---|---|
| 11,093,551 B1* | 8/2021 | Natarajan | G06F 40/205 |
| 11,295,078 B2* | 4/2022 | Turek | G06F 40/30 |
| 11,348,576 B1* | 5/2022 | Lynch | G10L 13/00 |
| 11,960,842 B2* | 4/2024 | Jayarao | G06F 40/30 |
| 11,967,309 B2* | 4/2024 | Persing | G10L 15/22 |

(Continued)

FOREIGN PATENT DOCUMENTS

| | | | | |
|---|---|---|---|---|
| CN | 119848227 A | * | 4/2025 | G06F 16/3329 |
| IN | 202341059278 A | | 11/2023 | |

(Continued)

OTHER PUBLICATIONS

William et al Personalization of Learning: Machine Learning Models for Adapting Educational Content to Individual Learning Styles "Journals & Magazines >IEEE Access >vol. 12Date of Publication: Aug. 30, 2024".

(Continued)

*Primary Examiner* — Laurie A Ries
(74) *Attorney, Agent, or Firm* — Caldwell Intellectual Property Law

(57) ABSTRACT

An apparatus and method for personalization of educational machine learning models. The apparatus includes at least a processor and a memory communicatively connected to the at least a processor. The memory instructs the processor to receive input data comprising one or more of a user profile and a request datum, generate, using a return generator, return output based on the request datum, identify, using a machine learning model, attribute data of the input data, generate, using a classifier, one or more classifications for the input data as a function of the attribute data associated with the input data, modify, using a natural language processor, the return output as a function of the user profile and one or more classifications assigned to the input data to generate user specific output, and display, using a downstream device, the user specific output.

18 Claims, 7 Drawing Sheets

(56) References Cited

U.S. PATENT DOCUMENTS

| | | | |
|---|---|---|---|
| 11,978,438 B1* | 5/2024 | Ramakrishna | G10L 15/1815 |
| 12,026,674 B2* | 7/2024 | Ken-Dror | G06F 16/435 |
| 12,039,285 B2* | 7/2024 | Ramanna | G06N 20/20 |
| 12,211,395 B2 | 1/2025 | Sha et al. | |
| 2012/0054646 A1* | 3/2012 | Hoomani | H04L 51/04 |
| | | | 715/758 |
| 2021/0192146 A1* | 6/2021 | Lee | G06N 3/045 |
| 2021/0280177 A1* | 9/2021 | Chao | G10L 15/32 |
| 2021/0326391 A1* | 10/2021 | Natarajan | G06N 5/022 |
| 2022/0075953 A1* | 3/2022 | Khetan | G06F 40/284 |
| 2022/0414166 A1* | 12/2022 | Juravicius | G06F 16/38 |
| 2023/0135962 A1* | 5/2023 | Lee | G06F 40/284 |
| | | | 704/9 |
| 2023/0169964 A1* | 6/2023 | Yannam | G10L 15/16 |
| | | | 704/232 |
| 2023/0376547 A1* | 11/2023 | Stewart | G06F 16/953 |
| 2024/0037327 A1* | 2/2024 | Kallepalli | G06F 40/211 |
| 2024/0046811 A1 | 2/2024 | Pagey | |
| 2024/0160846 A1* | 5/2024 | Jayarao | G06F 40/30 |
| 2024/0221725 A1* | 7/2024 | Poltorak | G10L 15/16 |
| 2024/0346254 A1* | 10/2024 | Liu | G06F 40/40 |
| 2024/0379019 A1 | 11/2024 | Naufel | |
| 2025/0046025 A1* | 2/2025 | Sanford | G06F 21/35 |
| 2025/0054068 A1* | 2/2025 | Arriaga | G06N 20/00 |
| 2025/0201142 A1* | 6/2025 | Varma | G09B 7/02 |
| 2025/0217199 A1* | 7/2025 | Smith | G06F 18/2415 |

FOREIGN PATENT DOCUMENTS

| | | | | |
|---|---|---|---|---|
| IN | 202421033119 A | | 6/2024 | |
| IN | 202441055868 A | | 8/2024 | |
| WO | WO-2019204252 A1 * | 10/2019 | | G06F 16/33 |
| WO | WO-2024223584 A1 * | 10/2024 | | G06N 20/00 |

OTHER PUBLICATIONS

A B F Mansur et al Personalized Learning Model based on Deep Learning Algorithm for Student Behaviour Analytic "Procedia Computer Sciencevol. 163, 2019, pp. 125-133".

* cited by examiner

APPARATUS AND METHOD FOR PERSONALIZATION OF EDUCATIONAL MACHINE LEARNING MODELS

FIELD OF THE INVENTION

The present invention generally relates to the field of machine learning. In particular, the present invention is directed to an apparatus and a method for personalization of educational machine learning models.

BACKGROUND

Existing educational machine learning models often struggle with providing personalized learning experiences due to their limited ability to dynamically adapt to individual user preferences, learning styles, or knowledge gaps. Additionally, many models lack robust mechanisms for integrating real-time feedback and contextual user data, resulting in outputs that may not fully address the unique needs of diverse learners.

SUMMARY OF THE DISCLOSURE

In an aspect, an apparatus for personalization of educational machine learning models includes at least a processor and a memory communicatively connected to the at least a processor. The memory contains instructions configuring the processor to receive input data comprising one or more of a user profile and a request datum, generate, using a return generator, return output based on the request datum, identify, using a machine learning model, attribute data of the input data, generate, using a classifier, one or more classifications for the input data as a function of the attribute data associated with the input data, modify, using a natural language processor, the return output as a function of the user profile and one or more classifications assigned to the input data to generate user specific output, and display, using a downstream device, the user specific output.

In another aspect, a method for personalization of educational machine learning models includes receiving, using at least a processor, input data comprising one or more of a user profile and a request datum, generating, using a return generator, return output based on the request datum, identifying, using a machine learning model, attribute data of the input data, generating, using a classifier, one or more classifications for the input data as a function of the attribute data associated with the input data, modifying, using a natural language processor, the return output as a function of the user profile and one or more classifications assigned to the input data to generate user specific output, and displaying, using a downstream device, the user specific output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for personalization of educational machine learning models. The apparatus includes at least a computing device comprised of a processor and a memory communicatively connected to the processor. The memory instructs the processor to receive input data comprising one or more of a user profile and a request datum. The processor generates, using a return generator, return output 116 based on the request datum. The processor identifies, using a machine learning model, attribute data of the input data. Additionally, the processor generates, using a classifier, one or more classifications for the input data as a function of the attribute data associated with the input data. The processor modifies, using a natural language processor, the return output 116 as a function of the user profile and one or more classifications assigned to the input data to generate user specific output. The memory then instructs the processor to display, using a downstream device, the user specific output.

Figure 1:
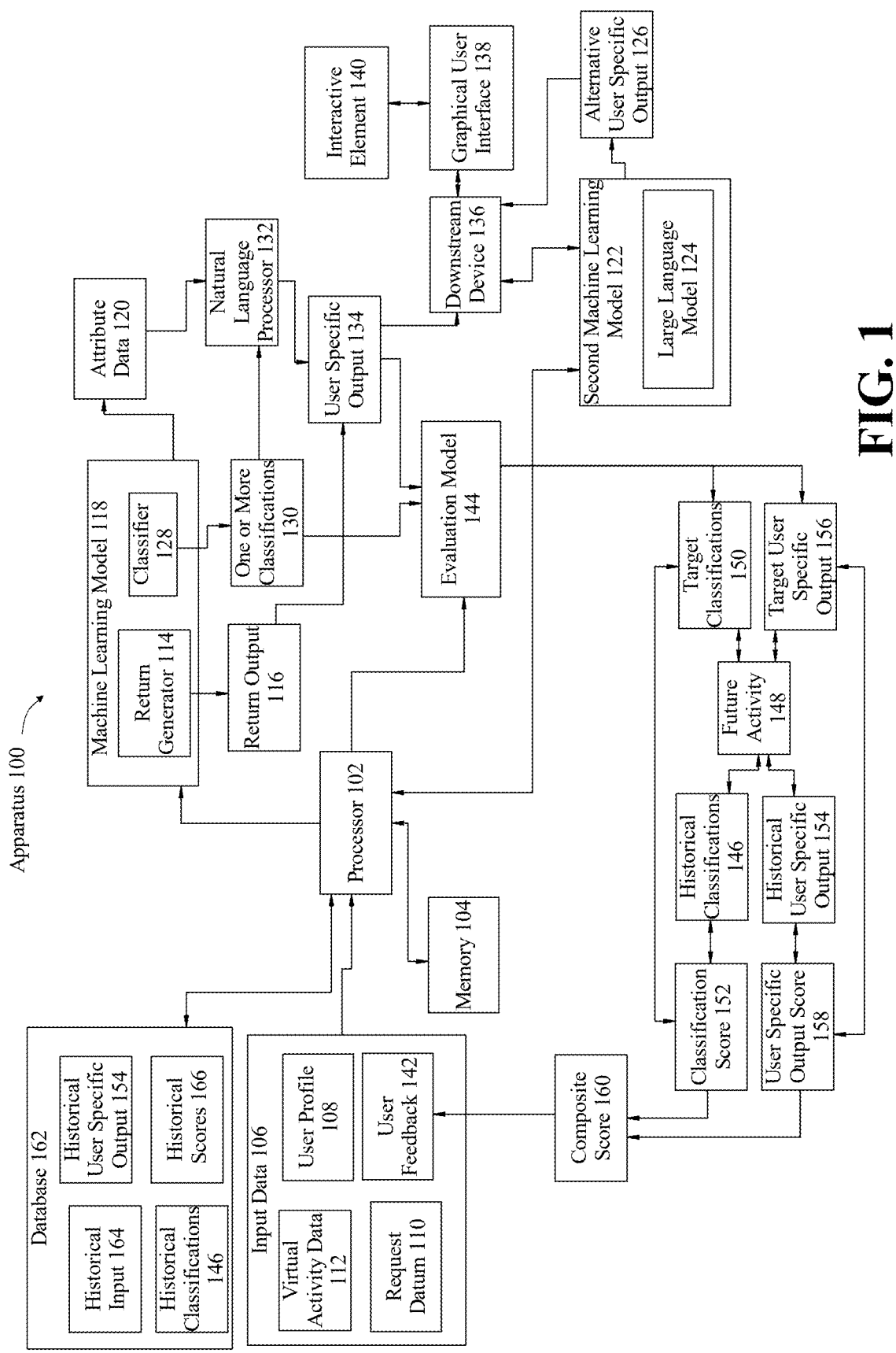
FIG. 1 is a block diagram of an apparatus for personalization of educational machine learning models.

Referring now to FIG. 1, an exemplary embodiment of apparatus 100 for personalization of educational machine learning models is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 102. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus 100 computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive input data 106 including one or more of a user profile 108 and a request datum 110. As used in this disclosure, "input data" is data provided to the apparatus 100 for processing, analysis, or computation. Input data 106 may include raw, processed, structured, and/or unstructured information originating from various sources such as user interactions, sensors, databases, or external systems. The nature and format of input data 106 may vary depending on the specific requirements of the apparatus 100 or process utilizing it. In an embodiment, input data 106 may include various types of information to enhance the functionality and adaptability of the apparatus 100. Without limitation, the input data 106 may include textual input, audio input, video input, and the like. In another non-limiting example, input data 106 may include user profile 108 data, which may include details such as preferences, past interactions, and demographic information to tailor the apparatus 100 responses or behavior. Additionally and or alternatively, input data 106 may include user questions, which may enable the apparatus 100 to process and generate contextually relevant outputs. Input data 106 may also include textual input, such as typed commands or written content, allowing the apparatus 100 to analyze and respond accordingly. Similarly, input data 106 may include audio input, enabling voice commands, spoken questions, or other sound-based interactions to be processed through speech recognition or audio analysis technologies. Input data 106 may also include audio input. The audio input may further extend the versatility of the input data 106 by allowing visual content, such as live video feeds or pre-recorded clips, to be analyzed for features like object recognition, motion detection, or user interaction cues. Without limitation, the input data 106 may be integrated into the apparatus 100 to enhance user engagement.

With continued reference to FIG. 1, "user profile" for the purposes of this disclosure is information pertaining to a user. In one or more embodiments, database may be populated with a plurality of user profiles 108 wherein each user profile 108 is associated with a differing user. In one or more embodiments, input data 106 includes user profile 108 specific to a particular user, such as the current individual interacting with apparatus 100. In one or more embodiments, user profile 108 may include but is not limited to, the age of the user, the geographical location of the user, the gender of the user and the like. In one or more embodiments, user profile 108 may include the educational background of a user, such as but not limited to, school attended, schools graduated, grades associated with the educational courses that the user attended, current educational courses the user is in, upcoming educational courses the user will be attending, previous exams taken, grades associated with previous exams taken, and the like. In one or more embodiments, user profile 108 may include information associated with previous interactions a user had with apparatus 100. Previous interactions may include, but are not limited to, inputs made by the user, outputs generated by apparatus 100 as a function of user inputs, and the like. In one or more embodiments, user profile 108 may include a dialect spoken by user. In one or more embodiments, user profile 108 may include words not understood by the user. In one or more embodiments, user profile 108 may include educational topics that a user is proficient in, and/or educational topics that a user is lacking. In one or more embodiments, user profile 108 may include preferences in which a user desires to receive outputs from apparatus 100. For example, user profile 108 may include a preference to receive outputs in a question-and-answer format, outputs in a multiple-choice format and the like.

With continued reference to FIG. 1, in a non-limiting example, user profile 108 may be consistent with one or more aspects of the user data described in U.S. patent application Ser. No. 18/122,340, filed on Mar. 16, 2023, titled "APPARATUS AND METHOD FOR GENERATING AN EDUCATIONAL ACTION DATUM USING MACHINE-LEARNING," which is incorporated by reference herein in its entirety.

With continued reference to FIG. 1, in some embodiments, user profile 108 may include virtual activity data 112 pertaining to user. As used in this disclosure, "virtual activity data" is data related to one or more virtual actions, wherein the virtual action is an action performed by user in a virtual environment, and or a physical environment. As used in this disclosure, a "virtual environment" is a digital environment which allows users to interact with it and elements/devices thereof within the virtual environment digitally. In some embodiments, virtual environment may be one of a computer system, computer network, and the like. In a non-limiting example, virtual environment may include a user device such as a tablet, laptop, desktop, smart phone and the like connected to network. In some embodiments, virtual environment may also include any electronically based elements associated with the virtual environment, as described in this disclosure. In a non-limiting example, virtual environment may include computer programs, data, data stores, and the like thereof. In some cases, virtual environment may be local to processor 102; for instance, and without limitation, virtual environment may be generated and hosted by processor 102 locally in a single computing device. In other cases, virtual environment may be remote to processor 102; for instance, virtual environment may be connected to the processor 102 by a network. Virtual environment may employ any type of network architecture. For example, and without limitation, virtual environment may employ a peer to peer (P2P) architecture where each computing device in a computing network is connected with every computing device in the network and every computing device acts as a server for the data stored in the computing device. In a further exemplary embodiment, virtual environment may also employ a client server architecture where a computing device is implemented as a central computing device (e.g., server) that is connected to each client computing device and communication is routed through the central computing device. However, the network architecture is not limited thereto. One skilled in the art, after having reviewed the entirety of this disclosure, will recognize the various network architectures that may be employed by the virtual environment. In other embodiments, any network topology may be used. In a non-limiting example, virtual environment may employ a mesh topology where a computing device is connected to one or multiple other computing devices using point to point connections. However, the network topology is not limited thereto. One skilled in the art, after having reviewed the entirety of this disclosure, will recognize the various network architectures that may be employed by the virtual environment. In a non-limiting example, virtual activity data 112 may be received, by processor 102, from virtual environment. Data related to user's activity in virtual environment such as, without limitation, online browsing, online shopping, social media posting, and the like may be collected by processor 102 as user profile 108.

With continued reference to FIG. 1, as used in this disclosure, "request datum" is a piece of information contained within a request, which may include specific details, parameters, or attributes necessary for processing or fulfilling the request. A request datum 110 may pertain to a single element of the overall request and may encompass data such as user identifiers, resource specifications, query terms, timestamps, or other relevant inputs that define or contextualize the request. In a non-limiting example, request datum 110 may include information such as the user's selection of a topic, such as geometry or algebra, a specific question identifier within the apparatus 100, or the type of assistance requested, such as a hint or a step-by-step solution. For instance, without limitation, if the user interacts with a sketchpad feature, a request datum 110 may capture details about the drawn shape, such as a triangle with specified angles, or the action performed, such as the addition of annotations or measurements. Similarly, if the user engages with a question prompt window, the request datum 110 may include the text of the question, the user's submitted response, or a request for clarification. In an embodiment, request datum 110 may be utilized to customize the user experience dynamically. For instance, the apparatus 100 may incorporate a modern open, microservice-based software architecture with Kubernetes orchestration to enable scalable and modular management of requests. When a user interacts with the sketchpad to solve a problem, the apparatus 100 may process the associated request datum 110 to provide tailored feedback, such as identifying errors in a geometric construction or offering suggestions to refine the drawing. If the user submits a question from the prompt window, the software may analyze the request datum 110 to fetch relevant explanations or similar questions for practice. This modular approach to handling request data may support seamless scalability and responsiveness across diverse educational scenarios. In a non-limiting example, the request datum 110 may represent a user's question or topic selection within the educational software implemented by the apparatus 100. For instance, if the request datum 110 is a user question, it may include queries such as "What is a dog?", "What is 2+2?", "Explain the process of photosynthesis," "What are the key features of Newton's laws of motion?," and the like. Additionally and or alternatively, if the request datum 110 pertains to a topic, it may include directives such as "Generate test prep material for the SAT verbal section," "Create practice questions for patent law fundamentals," "Provide a study guide for property law," "Generate flashcards for understanding key concepts in constitutional law," and the like. In an embodiment, the apparatus 100 may process these request data by leveraging a modular, microservice-based architecture to deliver personalized and contextually relevant educational content. For example, without limitation, when the user submits "What is 2+2?" as a question, the apparatus 100 may analyze it to provide the correct answer ("4") alongside additional resources to reinforce the concept of basic arithmetic as discussed in more detail herein. Similarly, for a topic request like "Generate test prep material for the SAT verbal section," the apparatus 100 may curate relevant practice materials, mock tests, and explanatory resources tailored to the user's proficiency level, goals, and the like. This flexible handling of request data ensures an enriched and responsive learning experience.

With continued reference to FIG. 1, in a non-limiting example, machine learning models may be consistent with one or more aspects of the machine learning models described in U.S. patent application Ser. No. 18/381,034, filed on Oct. 17, 2023, titled "APPARATUS AND METHOD FOR PERSONALIZATION OF MACHINE LEARNING MODELS," which is incorporated by reference herein in its entirety.

With continued reference to FIG. 1, in a non-limiting example, the machine learning models may be consistent with one or more aspects of the machine learning models described in U.S. patent application Ser. No. 19/043,876, filed on Feb. 3, 2025, titled "APPARATUS AND METHOD FOR PERSONALIZATION OF MACHINE LEARNING MODELS," which is incorporated by reference herein in its entirety.

With continued reference to FIG. 1, in a non-limiting example, the machine learning models may be consistent with one or more aspects of the machine learning models described in U.S. patent application Ser. No. 19/044,019, filed on Feb. 3, 2025, titled "APPARATUS AND METHOD FOR PERSONALIZATION OF MACHINE LEARNING MODELS," which is incorporated by reference herein in its entirety.

Still referring to FIG. 1, processor 102 generates, using a return generator 114, return output 116 based on the request datum 110. As used in this disclosure, a "return generator" is a component within the apparatus 100 designed to generate outputs in response to input data 106. The return generator 114 may be responsible for synthesizing, formatting, or delivering the generated output, which could include data, answers, recommendations, or other forms of content. The return generator 114 may utilize pre-defined rules, algorithms, or machine learning models to ensure that the return output 116 is accurate, relevant, and tailored to the specific request or context. In an embodiment, the return generator 114 may generate the return output 116 by leveraging a combination of processing mechanisms, algorithms, and or contextual analysis tailored to the input request. The return generator 114 may utilize natural language processing (NLP) techniques to interpret user queries or topics, extracting relevant keywords, intent, and context. For computational or analytical tasks, the return generator 114 may incorporate mathematical or logical algorithms to process and calculate results based on the input data 106. Additionally and or alternatively, the return generator 114 may draw upon a database or knowledge repository, querying structured or unstructured data to retrieve relevant information. In some implementations, the return generator 114 may use machine learning models trained on domain-specific datasets to generate predictive, personalized, or adaptive responses. As used in this disclosure, "domain-specific" is a particular field, subject area, or context of application. Domain-specific systems, processes, or models may be optimized to address the unique characteristics, terminology, and requirements of a specific domain, such as healthcare, education, law, or engineering. For example, without limitation, the return generator 114 for legal applications may be trained to understand legal terminology, case law, and statutes, enabling the return generator 114 to generate accurate and contextually relevant responses to legal queries. Similarly, in education, the return generator 114 may focus on academic topics and learning objectives to provide content aligned with curricula and student needs. This specialization allows the return generator 114 to provide solutions to deliver more accurate, relevant, and efficient outcomes compared to general-purpose approaches. The return generator 114 may also apply formatting rules to structure the output in a user-friendly and accessible format, such as lists, tables, visual elements, or text explanations. For example, if the input data 106 is "What is 2+2?", the return generator 114 may identify this as a basic arithmetic query, apply the relevant algorithm, and produce the output "4." Alternatively, for a more complex input like "Generate test prep material for the SAT verbal section," the return generator 114 may query a database of educational resources, apply topic filtering algorithms, and compile a set of practice questions and study materials tailored to the SAT verbal section. Without limitation, the process may ensure that the generated return output 116 aligns with the user's request while maintaining accuracy and relevance.

With continued reference to FIG. 1, as used in this disclosure, "return output" is the answer or response generated by the return generator 114 in reply to input data 106. The return output 116 may include various forms of data, explanations, or results produced by processing the input data 106 through the components of the apparatus 100, such as a return generator 114 or a processing model. For example, the return output 116 for the user query "What is a dog?" may be "A dog is a domesticated animal known for its loyalty and companionship." Similarly, for the query "What is 2+2?", the return output 116 may be "4." The return output 116 may be delivered in various formats, including text, audio, video, or interactive visual elements, depending on the requirements of the user interface, user preferences, and the like. Without limitation, the return output 116 may include additional context or supplemental information to enhance its relevance and usability.

Still referring to FIG. 1, processor 102 identifies, using a machine learning model 118, attribute data 120 of the input data 106. As used in this disclosure, "attribute data" are characteristics, traits, or properties associated with a user. In an embodiment, attribute data 120 may be used to personalize or optimize the functionality of the apparatus 100. Attribute data 120 may include measurable or observable factors, as well as inferred or contextual information, relevant to the operation or objectives of the apparatus 100. For example, without limitation, attribute data 120 may include a user's age, reading comprehension level, learning obstacles, emotional state/mood, and the like. Without limitation, attribute data 120 may be used by the apparatus 100 to adapt instructional materials, tailor feedback, or adjust the pacing of content delivery. Continuing, attribute data 120 may also include other user specific details such as preferences, prior knowledge, or performance metrics, enabling the apparatus 100 to provide a more effective and personalized experience.

In a non-limiting example, attribute data 120 may include specific characteristics tailored to individual users interacting with the apparatus 100. For instance, if the user is a 5-year-old, attribute data 120 such as age, reading comprehension level, and developmental stage may be used to present simplified language, colorful visuals, and engaging activities to maintain attention and enhance learning. Conversely, if the user is a 25-year-old, attribute data 120 may indicate a higher reading comprehension level, allowing the apparatus 100 to present detailed explanations, in-depth examples, and optional advanced challenges to promote critical thinking. Without limitation, for a user with learning disabilities, attribute data 120 captured during the user profile 108 setup may include accommodations or specific challenges, such as difficulty with reading or processing information. The apparatus 100 may use the attribute data 120 to enable accessibility features, such as text-to-speech functionality, larger font sizes, simplified content structure, and the like to ensure an inclusive learning experience tailored to the users needs. In another embodiment, attribute data 120 may track user behaviors, such as a tendency to close out of quizzes at the end of sessions and focus solely on outline material. Based on this behavior, the apparatus 100 may adapt by incorporating key quiz content into the outline summaries or prompting the user with reminders to complete quizzes for a more comprehensive learning experience. These specific examples highlight how attribute data 120 can dynamically inform the customization of the apparatus 100 to align with the unique needs, preferences, and behaviors of its users. In a non-limiting example, attribute data 120 may include a user's mood. Without limitation, the user's mood may be extracted by analyzing virtual behavior within the software, external activities on other websites, or environmental inputs captured by the computing device or downstream device 136. For instance, within the apparatus 100, the user's mood may be inferred from patterns such as the speed or frequency of user interactions, hesitation or repeated attempts on questions, deviations from typical engagement levels, and the like. Continuing, a user who rapidly skips questions or exits quizzes early may exhibit signs of frustration or distraction, prompting the apparatus 100 to offer encouraging messages, simplified content, or a break recommendation. Outside the software, attribute data 120 may be enriched by observing external behaviors such as browsing activity or social media engagement. For example, without limitation, if the user has been visiting websites related to stress relief or has posted content indicating fatigue or anxiety, the apparatus 100 may interpret this as a potential shift in mood and adjust its interactions by providing more supportive and empathetic responses or lighter learning tasks. In another embodiment, attribute data 120 related to mood may also be derived from environmental sounds captured by the computing device or downstream device 136. For instance, without limitation, sighs, changes in tone or volume during verbal inputs, or exclamations may indicate frustration, excitement, or confusion. The apparatus 100 may process these auditory cues to assess the user's emotional state and tailor its outputs accordingly. For example, if the apparatus 100 detects signs of frustration, it may provide motivational feedback, reduce the difficulty of tasks, or suggest calming activities. Continuing, these examples demonstrate how the apparatus 100 may leverage diverse inputs to assess and respond dynamically to a user's mood, enhancing the overall user experience.

With continued reference to FIG. 1, displaying the user specific output may include generating a graphical user interface, wherein the graphical user interface may include a first visual window arranged alongside a second visual window, the first visual window comprises the user specific output, and the second visual window is configured to present the output of a second machine learning model, wherein the second machine learning model comprises a large language model, wherein the large language model is configured to provide, as output in the second visual window, dynamic clarification as a function of the request datum and the user specific output. As used in this disclosure, "first visual window" is a designated region of the graphical user interface of the apparatus. The first visual window may serve as the primary interface through which the user interacts with content, receives information, and/or issues commands. In an embodiment, the first visual window may include a portion of a screen, a full-screen display, or a pop-up overlay and may be configured to dynamically adjust based on user preferences, system settings, or contextual inputs. The size, position, and content of the first visual window may be determined by predefined parameters, user customization, and/or adaptive algorithms that optimize visual presentation based on device capabilities and user engagement patterns. As used in this disclosure, "second visual window" is a designated region of the graphical user interface. The second visual window may appear in response to user interactions, system commands, or predetermined conditions and may function as a supplemental interface for displaying additional content, executing secondary tasks, or providing contextual information. In an embodiment, the second visual window may be a separate overlay, a pop-up, a split-screen view, or a dynamically generated section within the primary interface. The position, size, transparency, and interactive elements of the second visual window may be determined by user preferences, system configurations, or adaptive algorithms that optimize usability and display efficiency. In an embodiment, the first visual window may allow the user to input questions, topics, or study-related prompts, while the second visual window may generate responses based on those inputs. For example, without limitation, if a student is preparing for a biology exam and types "Explain cellular respiration," the first visual window may serve as the input area where they enter their request. In response, the second visual window may generate an explanation that outlines key steps, such as glycolysis, the Krebs cycle, and the electron transport chain, along with a labeled diagram of a mitochondrion. Continuing, if the student highlights "glycolysis," the second visual window may dynamically expand with additional clarifications, such as a breakdown of ATP production and how glucose is converted into pyruvate. In another embodiment, the user may be studying for a calculus test and may input a math problem into the first visual window, such as "Find the derivative of $f(x)=3x^2+5x-7$" The second visual window may then generate a step-by-step solution, demonstrating differentiation rules and calculations. The user specific output 134 may include an explanation of the power and sum rules, allowing the user to understand why each step is taken. If the student selects the portion of the solution that applies the power rule, the second visual window may provide an expanded, beginner-friendly explanation with additional examples, such as differentiating $f(x)=x^3$ to illustrate how the exponent decreases by one. The student may also modify their input in the first visual window to request an alternative solution method, such as implicit differentiation or graphical interpretation, and the second visual window may adjust its output accordingly. In another non-limiting example, a user preparing for a history exam may enter a question in the first visual window, such as "What were the causes of World War II?" The second visual window may generate, using the second machine learning model, a structured response listing key factors, such as the Treaty of Versailles, economic instability, and the rise of totalitarian regimes. Continuing, if the student selects "Treaty of Versailles," the second visual window may expand with additional details, such as specific treaty clauses that contributed to tensions or how economic reparations fueled resentment in Germany. Without limitation, the student may also request a comparative analysis by modifying their input to ask, "How did the Treaty of Versailles compare to the Marshall Plan?" prompting the second visual window to provide a contrast between punitive post-war measures and economic recovery efforts. In an embodiment related to language learning, a student may use the first visual window to input a request such as "List common Spanish verbs and their conjugations." The second visual window may then generate a response that includes a table of verbs like "hablar" (to speak), "comer" (to eat), and "vivir" (to live), along with their present-tense conjugations. If the student selects "comer," the second visual window may further expand with example sentences, such as "Yo como pizza todos los días" (I eat pizza every day), and explanations of verb conjugation patterns. Continuing, the student may also enter a follow-up request in the first visual window, such as "Explain the difference between regular and irregular verbs," prompting the second visual window to generate a detailed breakdown, highlighting irregular verbs like "tener" and "ser" with their conjugation differences. Without limitation, the dual-window system may enable an interactive and personalized learning experience, where the first visual window serves as the user's input area and the second visual window dynamically generates informative responses, clarifications, and expanded explanations based on the user's engagement. The apparatus may adapt in real-time, allowing for deeper exploration of concepts and tailored learning support.

A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, nonlimiting examples, textbooks, academic articles, study guides, lesson plans, quizzes, practice problems, student communications, teacher feedback, educational videos, and related content and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on the capability needed such as generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

With continued reference to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data 106, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data 106. In the case of natural language processing, input data 106 may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data 106 is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with input data 106.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, the apparatus 100 may further be configured to generate, using the second machine learning model 122, an alternative user specific output 126 as a function of the input data 106, wherein the input data 106 comprises activity data. As used in this disclosure, an "alternative user specific output" is a tailored and personalized return output 116 generated by the apparatus 100 that differs from the default output. In a non-limiting example, the alternative user specific output 126 may be customized based on the unique attributes, preferences, or behaviors of a specific user. Continuing, the alternative user specific output 126 may be adjusted to align with the user's needs, learning style, or emotional state, providing a personalized experience that enhances engagement and usability. For example, without limitation, if a user struggles with complex mathematical problems, the apparatus 100 may generate the alternative user specific output 126 that includes step-by-step explanations, visual aids, simplified examples, and the like. Similarly, if a user demonstrates a preference for auditory learning, the alternative user specific output 126 may be provided in the form of an audio explanation rather than text. In another instance, if attribute data 120 indicates that the user is in a hurried or distracted state, the apparatus 100 may present a concise summary or key takeaways as the alternative user specific output 126. Without limitation, the dynamic generation of alternative user specific output 126 may ensure that the responses are optimized to meet the diverse and evolving requirements of individual users. As used in this disclosure, "activity data" is information or records generated by user interactions, behaviors, or engagements within a system. Input data 106 may include activity data. Activity data may include metrics such as the frequency, duration, and type of actions performed by a user, as well as patterns of navigation, time spent on specific tasks, or sequences of completed activities. Additionally, activity data may include environmental or contextual inputs, such as sounds detected in the background such as, ambient noise, verbal cues, or voice tone, which can provide further insights into the user's environment or state during their interaction. For example, without limitation, activity data may include the number of quizzes taken, time spent reviewing specific topics, repeated attempts on challenging questions, and even detected background sounds, such as a quiet environment indicating focus or background chatter indicating potential distractions. This data may be utilized to analyze user engagement, adapt the content delivery, and tailor outputs to optimize the learning experience.

Still referring to FIG. 1, processor 102 generates, using a classifier 128, one or more classifications 130 for the input data 106 as a function of the attribute data 120 associated with the input data 106. As used in this disclosure, a "classification" is a category or class of the input data based on the attributes. Classification 130 may involve the use of algorithms, rules, or models to analyze data and determine the most appropriate classification 130 as described in more detail herein. For example, without limitation, a classification 130 may involve training a model, such as the classifier 128, to identify a user's skill level (e.g., beginner, intermediate, or advanced) based on their performance on quizzes or activities. Similarly, the classification 130 may apply to categorizing images, text, or audio into specific groups, such as recognizing handwritten digits or identifying the sentiment of a given sentence. The process of classification may enable the classifier 128 or apparatus 100 to make decisions, provide tailored outputs, and/or organize data, such as input data 106, efficiently based on its assigned categories. In a non-limiting example, classification 130 may include users grouped into learning profiles based on their preferred study methods. For instance, the classifier 128 may classify a user as a "visual learner" if they frequently interact with diagrams, charts, or videos, or as an "auditory learner" if they prefer listening to audio explanations. Continuing, by classifying users into the classifications 130, the apparatus 100 may provide content, or user specific output 134 in formats that align with the users learning style, such as presenting material as infographics for visual learners or offering narrated summaries for auditory learners. Another example of possible classifications 130 may include categorizing users based on the type of errors they commonly make. For instance, a user may be classified as prone to "conceptual errors" if they consistently misunderstand the underlying principles of a subject, or as prone to "calculation errors" if they frequently make mistakes in basic arithmetic. This classification 130 may allow the apparatus 100 to customize feedback or the user specific output 134 by addressing the specific weaknesses of the user, such as offering additional conceptual tutorials for the former or providing practice exercises to enhance accuracy for the latter. Without limitation, these targeted approaches may enhance the personalization and effectiveness of the learning experience.

Still referring to FIG. 1, processor 102 modifies, using a natural language processor 132, the return output 116 as a function of the user profile 108 and one or more classifications 130 assigned to the input data to generate user specific output 134. As used in this disclosure, a "natural language processor (NLP)" refers to a component designed to analyze, interpret, and process human language in its natural form. For instance, the NLP may receive as input various types of data including, but not limited to, text data or auditory data. A natural language processor 132 may utilize techniques from computational linguistics, artificial intelligence, and machine learning to understand the structure, meaning, and context of language and generate appropriate responses or actions based on the input. For example, without limitation, the natural language processor 132 may parse a user's query, such as "Explain the process of photosynthesis," to identify the main topic ("photosynthesis") and the request type ("explanation"). The NLP may then retrieve or generate a detailed response tailored to the query. In another instance, the natural language processor 132 may analyze spoken commands like "Set a timer for 10 minutes" by converting the audio input to text, extracting the intent (to set a timer), and executing the command within the system. The natural language processor 132 may enable the apparatus 100 to engage in intuitive and effective interactions with users by interpreting natural language inputs and producing relevant outputs. In an embodiment, the user profile 108 may contain specific details about the individual, such as preferences, learning styles, or prior interactions, while the one or more classifications 130 assigned to the input may identify its nature, intent, or context, such as topic categories or user skill level. Continuing, by incorporating these elements, processor 102 may dynamically tailors the return output 116 to create the user specific output 134 that aligns with the individual's unique needs and the context of the request datum 110. For example, without limitation, if the request datum 110 is a user query such as "Explain Newton's first law," and the user profile 108 indicates a preference for visual learning, processor 102, through the natural language processor 132, may modify the return output 116 to include diagrams or visual aids alongside the textual explanation. If classifications 130 assigned to the input data 106 indicate that the user is at a beginner level, the explanation may be simplified with relatable examples. This process ensures that the user specific output 134 is not only accurate but also highly relevant and engaging, enhancing the overall effectiveness of the system's interaction with the user. In another non-limiting example, if the classification 130 indicates that the user is frustrated, as determined through patterns in their interactions or auditory cues such as, abrupt navigation changes, fast typing, or sighs detected by microphones on the downstream device 136, processor 102 may dynamically adjust the return output 116 to generate the user specific output 134 designed to alleviate frustration and enhance engagement. For instance, if the input data 106 includes request datum 110 that queries "Explain Newton's first law," and the user's mood is classified as frustrated, the natural language processor 132 may simplify the response and provide additional supportive elements. Instead of a dense, technical explanation, the return output 116 may be adjusted to include a concise definition, an encouraging message like "You're doing great! Let's simplify this together," and a short video or interactive animation to visually explain the concept. Without limitation, the goal may be to reduce the user's cognitive load and frustration by presenting the information in a more approachable and reassuring manner, ensuring the output is both effective and emotionally supportive. Similarly, without limitation, if the classification 130 indicates that the user is happy and engaged, as determined through patterns such as consistent interaction, fast response times, or positive auditory cues such as laughter or enthusiastic tone detected by the downstream device 136, processor 102 may dynamically adjust the return output 116 to generate the user specific output 134 that leverages this elevated engagement. Continuing, if the input data 106 includes the user query "Explain Newton's first law," and their mood is classified as happy and engaged, the natural language processor 132 may enhance the response with additional layers of interactivity and challenge. The return output 116 may include a detailed explanation, an interactive simulation where the user can test the law with virtual objects, and a follow-up question like "Can you think of a real-world example where this law applies?" to spark curiosity and deeper learning. Additionally and or alternatively, the user specific output 134 may include a playful or celebratory element, such as an encouraging message like "Great energy! Keep it up—you're mastering physics!" Without limitation, this tailored approach may maximize the user's engagement and takes advantage of their positive mood to deepen the learning experience.

With continued reference to FIG. 1, as used in this disclosure, "user specific output" is data generated by natural language processing that is tailored to individual users. The user specific output 134 may be derived from processing input data 106, historical data, contextual information, or a combination thereof, ensuring the response is relevant and personalized to the user's query or interaction. In a non-limiting example, user specific output 134 may include a step-by-step explanation for solving a math problem entered by the user, suggestions for additional study material based on the user's past queries, or visual annotations on an uploaded diagram to clarify a specific concept. The user specific output 134 may be designed to enhance the user experience by providing targeted and meaningful responses that address the user's unique requirements or goals.

With continued reference to FIG. 1, the natural language processor 132 may be further configured to adapt linguistic phrasing of the user specific output 134 based on the attribute data 120, wherein the attribute data 120 comprises demographic preferences extracted, using the at least a processor 102, from the user profile 108. As used in this disclosure, "linguistic phrasing" is the specific arrangement, choice, and style of words or expressions used to convey meaning in spoken or written communication. Linguistic phrasing may include syntax, vocabulary, tone, and contextual nuances that may influence how information is interpreted and understood by the recipient. For example, without limitation, linguistic phrasing may involve choosing simple, clear language to explain complex topics to beginners or using technical jargon and formal structures for advanced learners. The tone and phrasing may also adapt to the context, such as using concise, directive language for instructions, like "Drag the shape to the box," or encouraging, empathetic language to support user engagement, like "You're doing great! Let's tackle this step by step." In a non-limiting example, the natural language processor 132 may adapt the linguistic phrasing of the user specific output 134 based on attribute data 120 comprising demographic preferences extracted from the user profile 108. For instance, if the attribute data 120 indicates that the user is a teenager, the natural language processor 132 may use casual, relatable language with contemporary references to maintain engagement. For a query such as "Explain Newton's first law," the linguistic phrasing might be adapted to: "Newton's first law is like saying, 'If you're chilling on the couch, you'll stay there unless something makes you get up.' It's all about objects staying in motion or at rest unless something changes it." Alternatively, if the attribute data 120 identifies the user as a professional or adult learner with a preference for formal communication, the linguistic phrasing may take a more academic tone. For the same query, the output could be phrased as: "Newton's first law of motion states that an object will remain at rest or in uniform motion in a straight line unless acted upon by an external force. This principle highlights the concept of inertia." In another example, if the demographic preferences extracted from the user profile 108 indicate the user is an international learner with a preference for simplified English, the linguistic phrasing may focus on clarity and avoid idiomatic expressions. The explanation might be phrased as: "Newton's first law says that things stay still or keep moving in a straight line unless something pushes or pulls them. This is called inertia." These examples illustrate how the natural language processor 132 dynamically adjusts linguistic phrasing to align with the demographic preferences of the user, ensuring accessibility, relevance, and engagement.

With continued reference to FIG. 1, as used in this disclosure, "demographic preferences" are characteristics that are assigned to segments of a population. Such attributes may include age, gender, income level, education, occupation, cultural background, geographic location, lifestyle choices, behavior, and the like. Demographic preferences may be derived from input data 106, analyzing user engagement patterns, such as frequency, duration, and type of interactions with the apparatus 100, monitoring how a user interacts with the apparatus 100, including preferred settings, applications used, and input methods, to derive demographic insights, and the like. For example, language settings and content consumption habits may indicate cultural or educational background. In an embodiment, the apparatus 100 may incorporate machine learning algorithms, sensor-based inputs, or user-driven selections to infer demographic preferences. Behavioral analysis may play a key role, where the frequency, duration, and type of user interactions with the apparatus 100 provide insights into demographic preferences. For instance, without limitation, repeated engagement with fitness applications may indicate an active lifestyle preference. Additionally and or alternatively, demographic preferences may be extracted from account registration and user profile 108, where users provide details such as name, age, location, gender, and occupation during account setup or periodic updates. Device usage patterns may also contribute to demographic preferences by analyzing preferred settings, application usage, and input methods. A user's language settings and content consumption habits, for example, may indicate cultural or educational background. Purchase and transactional data can further refine demographic insights by evaluating a user's spending behavior, brand preferences, and subscription history. Social and network interactions, including communication patterns and social media activity, may reveal professional affiliations or peer group demographics. Location-based analysis, leveraging GPS data and check-in patterns, may help determine urban or rural living preferences, while voice and speech recognition may be utilized to analyze linguistic tendencies, age range, or regional accents. Furthermore, computer vision and image analysis may provide demographic preferences by evaluating user-submitted photos or video feeds, identifying attributes such as age, gender, or lifestyle indicators. Feedback and survey data may supplement these methods by incorporating direct user responses into the demographic profiling process. AI-based predictive modeling may then synthesize multiple data sources, continuously refining its understanding of user characteristics to improve personalization. In an embodiment, the apparatus 100 may dynamically update demographic preferences in real-time based on evolving interactions, ensuring more accurate recommendations and tailored user experiences.

Still referring to FIG. 1, processor 102 displays, using a downstream device 136, the user specific output 134. As used in this disclosure, "downstream device" is a device that accesses and interacts with apparatus 100. For instance, and without limitation, downstream device 136 may include a remote device and/or apparatus 100. In a non-limiting embodiment, downstream device 136 may be consistent with a computing device as described in the entirety of this disclosure. Without limitation, the downstream device 136 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the user specific output 134 may include displaying the user specific output 134 at display device using a visual interface. As used in this disclosure, a "visual interface" is a digital display that presents information, options, interactive elements to users in an intuitive and visually appealing manner. In some embodiments, visual interface may include at least an interface element. As used in this disclosure, "at least an interface element" is a portion of visual interface. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler. For instance, if the user specific output 134 is an educational video tailored to the user's skill level and preferences, the processor 102 may transmit the video to a tablet for the user to watch in an interactive learning environment. In another example, if the user specific output 134 is a detailed textual explanation of a concept, such as "Explain Newton's first law," the processor 102 may display the user specific output 134 as text with accompanying diagrams on a computer monitor. The display may include interactive features, such as buttons for related topics or additional examples, allowing the user to navigate further learning resources seamlessly. In another embodiment, if the user specific output 134 includes auditory feedback, such as a spoken explanation of a question, the processor 102 may utilize a smartphone's audio playback system to deliver the explanation while synchronously displaying associated visual aids on the screen. These examples highlight how processor 102 may leverage various downstream devices 136 to present the user specific output 134 effectively and contextually.

With continued reference to FIG. 1, displaying the user specific output 134 using a graphical user interface 138 of the downstream device 136 may further include displaying, using the graphical user interface 138, an interactive element 140. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 138. For example, links to decentralized platforms as described in this disclosure may be incorporated using icons. Using an icon may be a fast way to open documents, run programs etc. because clicking on them yields instant access. In an embodiment, the graphical user interface 138 and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying user specific output 134, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a model, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. As used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include any data transmitted to display device, client device, and/or graphical user interface 138. In some embodiments, visual element may be interacted with. For example, visual element may include an interface, such as a button or menu. In some embodiments, visual element may be interacted with using a user device such as a smartphone, tablet, smartwatch, or computer. In an embodiment, the apparatus 100 and or the downstream device 136 may include a data structure. With continued reference to FIG. 1, as used in this disclosure, "data structure" is a way of organizing data represented in a specialized format on a computer configured such that the information can be effectively presented in a graphical user interface 138. In some cases, the data structure includes any input data 106. In some cases, the data structure contains data and/or rules used to visualize the graphical elements within a graphical user interface 138. In some cases, the data structure may include any data described in this disclosure. In some cases, the data structure may be configured to modify the graphical user interface 138, wherein data within the data structure may be represented visually by the graphical user interface 138. In some cases, the data structure may be continuously modified and/or updated by processor 102, wherein elements within graphical user interface 138 may be modified as a result. In some cases, processor 102 may be configured to transmit display device and or the downstream device 136 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure, such as a dictionary or tree, that maps each topic to its associated resources or actions. The data structure may retrieve the relevant information such as, text explanations, videos, or interactive exercises, and passes it back to the event handler, which may then trigger the appropriate updates to the GUI, such as displaying the selected topic's content. In another embodiment, the data structure may also maintain the state of the system, tracking user progress, preferences, and session history. For instance, without limitation, a hash table may store user specific configurations, such as preferred learning styles or recent activity, which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface that allows users to perform actions, provide input, or engage with the apparatus 100. Interactive elements 140 may be designed to facilitate two-way communication between the user and the system, enabling the user to influence the behavior of the apparatus or obtain feedback in response to their actions. Examples of interactive elements 140 may include buttons, dropdown menus, sliders, checkboxes, input fields, and hyperlinks. For instance, without limitation, a button labeled "Submit" may allow a user to send their input for processing, while a slider may let the user adjust settings, such as the difficulty level of an educational activity. More advanced interactive elements 140 may include drag-and-drop interfaces, interactive diagrams, or dynamically updating content areas that respond to user actions in real time. The interactive elements 140 may enhance user engagement by providing intuitive and responsive mechanisms for interacting with the system. Interactive elements 140 may operate by responding to user actions such as clicks, taps, swipes, or keyboard inputs, and triggering predefined system behaviors or processes. The execution of the interactive elements 140 may require a combination of front-end and back-end technologies that work together to provide seamless functionality and user interaction. On the front end, technologies such as HTML and CSS may define the structure, appearance, and layout of the interactive elements 140, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data, such as a user's profile or quiz questions. Additional supporting technologies may ensure the smooth operation of interactive elements 140. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles 108 or historical activity. Communication technologies may also help maintain the responsiveness of interactive elements 140. AJAX (Asynchronous JavaScript and XML) may allow the front end to update portions of a web page without requiring a full page reload, enhancing responsiveness. WebSockets may provide real-time interaction capabilities, such as live chats or collaborative tools, by enabling persistent communication between the client and the server. For example, without limitation, a button labeled "Start Quiz" in an educational application may be rendered using HTML and CSS, while JavaScript adds an event listener to detect when the button is clicked. Once clicked, the event listener may send a request to an API. The server may process this request, fetch the quiz data, and return it to the front end, which then dynamically displays the quiz interface without requiring the user to reload the page. This combination of technologies may ensure that interactive elements 140 are intuitive, responsive, and capable of handling complex user interactions effectively. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, the interactive element may be configured to receive user feedback 142 regarding the user specific output 134, modify the user specific output 134 based on the user feedback 142, and update the user profile 108 using the user feedback 142. As used in this disclosure, "user feedback" is information, responses, or data provided by a user that reflects their experience, preferences, satisfaction, or interactions with a system. User feedback 142 may include direct input, such as comments, ratings, or survey responses, as well as indirect behavioral data, such as navigation patterns, time spent on tasks, or frequency of feature usage. For example, without limitation, user feedback 142 may include a rating of a quiz's difficulty, textual comments on the clarity of explanations, or completion rates for assigned tasks. User feedback 142 may be actively solicited through prompts or forms or passively collected through user interactions with the system. Without limitation, by analyzing user feedback 142, the apparatus 100 may refine its operations, adapt content, and improve the overall user experience by aligning its offerings with user needs and expectations. The interactive element may further utilize the user feedback 142 to modify the user specific output 134 dynamically. For example, without limitation, if the user feedback 142 indicates that an explanation is too complex, the system may simplify the user specific output 134, add visual aids, or offer an alternative approach to the content. Conversely, if the user feedback 142 reflects that the user specific output 134 is too simplistic for the user's skill level, the system may generate a more detailed or advanced explanation. This real-time adaptability ensures that the system can refine its responses to better align with the user's expectations and preferences, enhancing the overall experience. Additionally and or alternatively, the interactive element may update the user profile 108 using the user feedback 142 received. This update may involve incorporating insights about the user's preferences, learning style, or areas of difficulty. For example, if the user frequently requests simplified content, the system may adjust the user profile 108 to reflect a preference for straightforward explanations, enabling it to generate similarly tailored outputs in the future. This iterative process may allow the system to continuously learn and evolve based on user interactions, creating a more personalized and effective experience over time. Without limitation, the integration of user feedback 142 into the interactive element, the user specific output 134, and the user profile 108 may ensure that the system remains highly adaptable and user-centric.

With continued reference to FIG. 1, the apparatus 100 may further include an evaluation model 144, wherein the at least a processor 102 is further configured to compare, using the evaluation model 144, historical classifications 146 to future activity 148, determine, using a comparison of the historical classifications 146 to the future activity 148, target classifications 150, generate a classification score 152 as a function of a difference between the historical classifications 146 and the target classifications, and iteratively train the classifier 128 using the classification score 152. As used in this disclosure, an "evaluation model" is a computational framework, algorithm, or set of criteria designed to assess, analyze, or measure the quality, effectiveness, or performance of a system. The evaluation model 144 may process input data 106, such as user feedback 142, system metrics, or contextual factors, and generate results or scores that inform decision-making, optimization, and improvement efforts. For example, without limitation, the evaluation model 144 may assess the effectiveness of a user specific output 134, such as a tailored explanation, by analyzing user feedback 142, comprehension scores, or interaction data. The evaluation model 144 may include parameters such as clarity, relevance, user engagement, and outcome success. Continuing, based on this analysis, the evaluation model 144 may recommend adjustments to improve future outputs or update user profiles 108. The evaluation model 144 may leverage techniques such as machine learning, statistical analysis, or rule-based algorithms to ensure accurate and context-sensitive assessments. As used in this disclosure, "historical classifications" are categorizations or labels assigned to past input data. Without limitation, the historical classifications 146 may be derived from analyzing historical data and are used to identify patterns, trends, or attributes relevant to the user or the system's operations. Historical classifications 146 may include categories such as user preferences, skill levels, learning styles, or frequently accessed content. For example, without limitation, historical classifications 146 may indicate that a user has consistently preferred visual learning aids or has been categorized as a beginner in mathematics based on past interactions. The historical classifications 146 may be used to inform the generation of user specific outputs 134, updates to the user profile 108, or predictive modeling for future interactions. As used in this disclosure, "future activity" is subsequent actions, behaviors, or interactions of a user or system. Future activity 148 may include tasks, processes, or engagements that the system collects and analyses to optimize the user experience or achieve specific objectives. For example, future activity 148 may include the user completing a sequence of lessons tailored to their preferences or skill level, such as progressing to geometry exercises after finishing algebra topics. The future activity 148 may include subsequent actions that are part of the user's interaction within the system and contribute to their learning journey. In another example, future activity 148 may involve the user participating in scheduled quizzes or engaging with practice problems provided by the system. If the user tends to explore additional resources after completing a lesson, future activity 148 may include reviewing supplementary materials or revisiting earlier content for reinforcement.

With continued reference to FIG. 1, as used in this disclosure, "target classifications" are categories, labels, or outcomes that the system aims to assign to input data 106, interactions, or users based on predefined objectives, goals, or criteria. Target classifications 150 may represent the desired categorizations or states that guide the system's processing, decision-making, or outputs, enabling alignment with user needs, system goals, or operational requirements. For example, without limitation, the target classifications 150 may include identifying a user's skill level such as, beginner, intermediate, advanced, for a particular subject or determining the user's preferred learning style like, visual, auditory, kinesthetic, to tailor content delivery. The system may use machine learning models, rule-based algorithms, or evaluation criteria to classify user input or interactions into these predefined targets. Continuing, by aligning input data 106 with target classifications 150, the system ensures that its outputs, such as recommendations, explanations, or next steps, are relevant and optimized to achieve specific educational or functional goals. As used in this disclosure, a "classification score" refers to a numerical or probabilistic value that quantifies the degree of confidence or likelihood that a given input, interaction, or data point belongs to a specific category or class. The classification score 152 may be generated by a machine learning model, statistical algorithm, or rule-based system as part of the classification process and may guide decision-making or system behavior based on the results. For example, without limitation, the classification score 152 may indicate the probability that the user is a visual learner based on their interactions with diagrams and videos, such as assigning a score of 0.85 (85% likelihood) to the "visual learner" category. Similarly, the classification score 152 may represent the confidence level in categorizing a user's question under a particular subject, such as 0.92 for "Physics" or 0.65 for "Mathematics." The apparatus 100 may use the classification scores 152 to prioritize or refine outputs, such as presenting content that aligns with the category having the highest classification score 152. Without limitation, by leveraging classification scores 152, the apparatus 100 may ensure more accurate, adaptive, and effective responses to user input or behavior. In an embodiment, the comparison between the historical classifications 146 to the future activity 148 may allow the processor 102 to determine target classifications 150 by analyzing how historical patterns align with subsequent user actions or interactions. The processor 102 may further generate the classification score 152 based on the difference between the historical classifications 146 and the target classifications 150, providing a quantifiable measure of alignment or deviation. Using this classification score 152, the processor 102 may iteratively train the classifier 128, refining its accuracy and adaptability to improve its ability to categorize inputs and predict or support future activity 148 more effectively.

With continued reference to FIG. 1, the at least a processor 102 may be further configured to compare, using the evaluation model 144, a historical user specific output 154 with the future activity 148, determine, using a comparison of the historical user specific output 154 with the future activity 148, a target user specific output 156, generate a user specific output score 158 as a function of a difference between the historical user specific output and the future activity 148, and iteratively train the natural language processor 132 using the user specific output score 158. As used in this disclosure, a "historical user specific output" is a prior response, result, or content generated by the apparatus 100 that was tailored to a specific user based on their attributes and/or input data 106. The historical user specific output 154 may reflect the system's interaction history with the user and serves as a record of personalized responses previously provided. As used in this disclosure, a "target user specific output" is the desired or ideal response that the apparatus 100 aims to generate for a specific user. Without limitation, the target user specific output 156 may be tailored to align with the user's future activity 148, goals, or evolving needs, providing the most relevant and effective interaction based on current and historical data. With continued reference to FIG. 1, the processor 102 may be configured to compare the historical user specific output 154 with future activity 148 using the evaluation model 144. Continuing, the comparison may identify how past tailored responses align with the user's subsequent actions or interactions. Based on this analysis, the processor 102 may determine a target user specific output 156 that better aligns with the user's future activity 148 or anticipated needs. The processor 102 may calculate a user specific output score 158 by evaluating the difference between the historical user specific output 154 and the future activity 148, quantifying the degree of alignment or divergence. Without limitation, the user specific output score 158 may then be used to iteratively train the natural language processor 132, enhancing its ability to generate accurate, relevant, and user-tailored outputs in future interactions. As used in this disclosure, a "user specific output score" is a metric that quantifies the degree of alignment or discrepancy between a generated user specific output 134 and the target user specific output 156. Without limitation, the user specific output score 158 may provide a measure of how effectively the apparatus 100 has tailored its response to the specific user's needs, preferences, or behaviors. For example, without limitation, the user specific output score 158 may reflect how well a personalized explanation matched the user's understanding level, based on subsequent interactions or feedback. A higher score may indicate a closer alignment with the user's expectations or requirements, while a lower score may suggest areas for improvement. This metric may be used to refine the system's outputs, enhance user satisfaction, and iteratively train components such as the natural language processor 132 for better future performance.

With continued reference to FIG. 1, the evaluation model 144 may be further configured to calculate a composite score 160 as a function of integrating the classification score 152, the user specific output score 158, iteratively update the composite score 160 based on user feedback 142 received though an interactive element, and provide the composite score 160 as training feedback for the classifier 128 and the natural language processor 132. As used in this disclosure, a "composite score" is an aggregated or combined metric derived from multiple individual scores. In some embodiments, composite score may represent a holistic evaluation of a system. The composite score 160 may be calculated using various techniques, such as weighted averages, summation, or machine learning algorithms, to provide a single, comprehensive value that reflects multiple dimensions of performance, alignment, or relevance. For example, without limitation, the composite score 160 may combine individual metrics such as user engagement, comprehension levels, and task completion rates to assess overall learning effectiveness. In another scenario, the composite score 160 may aggregate classification scores 152, user specific output scores 158, and feedback ratings to evaluate the system's ability to personalize outputs. Without limitation, by summarizing diverse inputs into a unified metric, the composite score 160 may simplify decision-making, enable comparisons, and guide iterative improvements in the system's performance.

With continued reference to FIG. 1, the apparatus 100 may further include a database 162 communicatively connected to the at least a processor 102, wherein the at least a processor 102 is configured to store, using the database 162, one or more of historical input 164, historical classifications 146, historical user specific output 154, and historical scores 166. As used in this disclosure, a "database" is an organized collection of data stored and managed electronically, designed to support efficient access, retrieval, modification, and storage of information. The database 162 may utilize a structured format, such as tables, rows, and columns, or a more flexible format, such as documents or key-value pairs, depending on the underlying database 162 management system (DBMS). For example, without limitation, the database 162 may store user profiles 108, historical classifications 146, user specific outputs 134, feedback, and other data. Continuing, the data may be queried or updated by the apparatus 100 as needed to generate tailored responses, track user progress, or adapt content. Databases may be relational such as, MySQL, PostgreSQL, non-relational like, MongoDB, Cassandra, or hybrid, depending on the system's requirements. The database 162 may serve as a central repository to enable the apparatus 100 to organize and manage data effectively, ensuring reliability, scalability, and accessibility in its operations.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
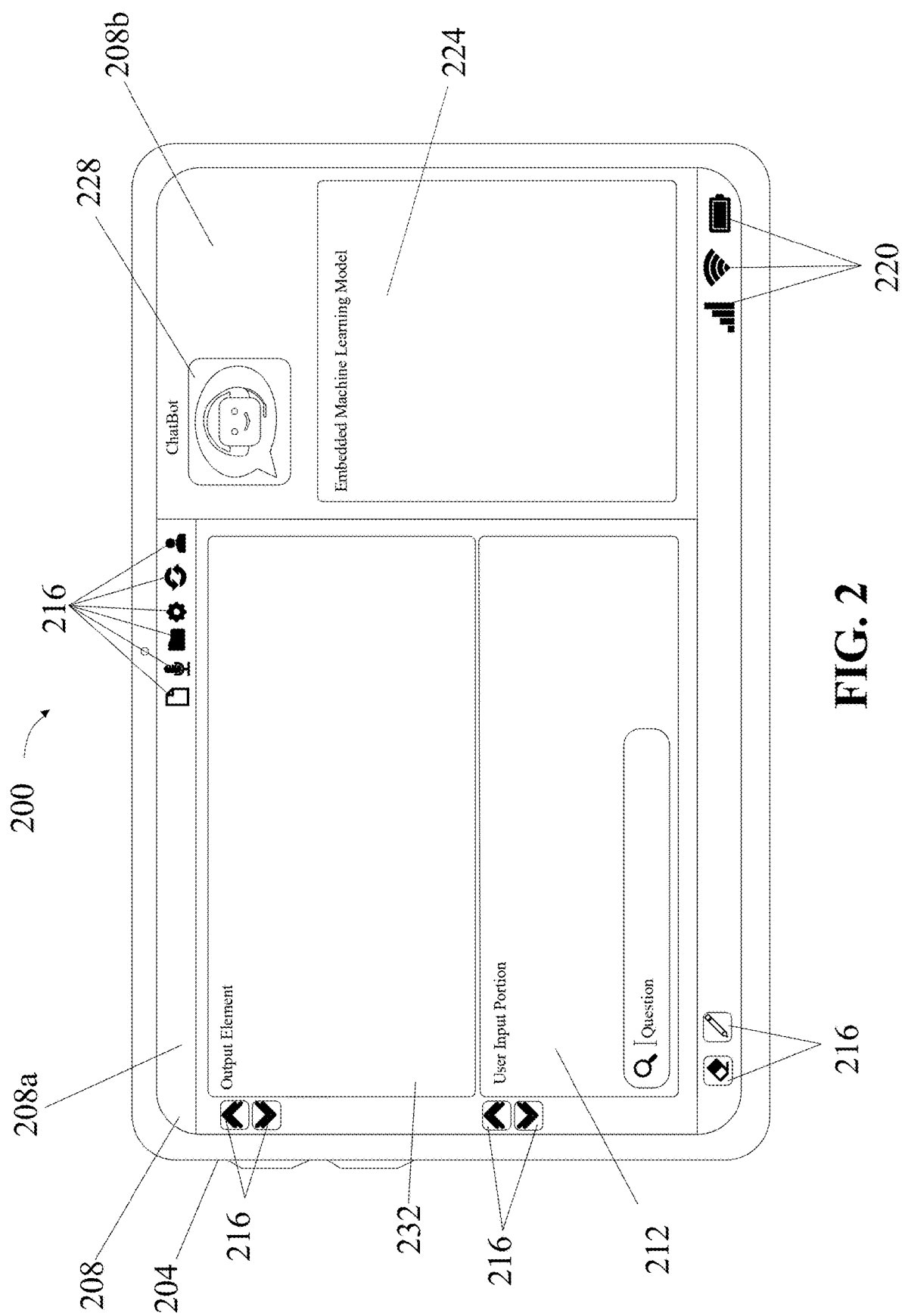
FIG. 2, is an exemplary illustration of a graphical user interface.

Referring now to FIG. 2, an exemplary illustration, 200, of a graphical user interface. In an embodiment, the illustration 200 includes a downstream device 204. The downstream device 204 may serve as the hardware interface for delivering outputs generated by the apparatus. The downstream device 204 may include a tablet, smartphone, laptop, or other computing system capable of receiving data from the processor and presenting it to the user. The downstream device 204 may provide the primary platform for user interaction with the system.

With continued reference to FIG. 2, in an embodiment, the downstream device 204 includes a graphical user interface 208. The graphical user interface 208 may facilitate interactions between the user and the system. The GUI 208 may visually display content, enable inputs, and provide outputs in a manner that is user-friendly and intuitive. The GUI 208 may act as the gateway for engaging with the system's functionality. In an embodiment, the GUI 208 may include a first visual window 208a. In an embodiment the GUI 208 may include a second visual window 208b. The first visual window 208a may display the output element 232 as described herein. The first visual window 208a may display the user input portion 212 as described below. The second visual window may display outputs generated by the machine learning model 224. The second visual window 208b may display the chatbot 228 as described herein.

With continued reference to FIG. 2, in an embodiment, the graphical user interface 208 includes a user input portion 212. The user input portion 212 may allow users to provide inputs, such as typing text, selecting options, or uploading files. For example, the user may input a query or select topics for test preparation through the user input portion 212 of the interface, initiating interaction with the apparatus.

With continued reference to FIG. 2, in an embodiment, the graphical user interface 208 includes one or more interactive elements 216. The one or more interactive elements 216 may include buttons, sliders, dropdown menus, and the like. The one or more interactive elements 216 may facilitate user actions like submitting responses, navigating between sections, or selecting specific features. For example, the one or more interactive elements 216 may allow users to toggle between question sets or customize the display preferences. In an embodiment, the interactive elements 216 may include arrow icons to reconfigure the user input portion 212 and/or the output element 232 as discussed in more detail below.

With continued reference to FIG. 2, in an embodiment, the graphical user interface 208 includes visual elements 220. The visual elements 220 may include icons, charts, images, animations, and the like. The visual elements 220 may enhance the user's understanding of the content. For instance, visual elements 220 may include graphical representations of data or illustrations accompanying test questions, providing a more engaging and comprehensive experience.

With continued reference to FIG. 2, in an embodiment, the graphical user interface 208 includes a response portion 224. The response portion 224 may display output generated by the apparatus. The response portion 224 may present tailored responses, such as answers to user queries, explanations of concepts, feedback on submitted responses, providing immediate and contextually relevant information. In an embodiment, the response portion 224 displays answers generated by the machine learning model 228 as discussed in detail below.

With continued reference to FIG. 2, in an embodiment, the graphical user interface 208 includes a machine learning model 228. The machine learning model 228 may operate behind the scenes to analyze inputs, generate outputs, and adapt responses based on user interactions. The machine learning model 228 may refine its output over time, ensuring that the system remains responsive to the user's evolving needs and preferences. In an embodiment, the graphical user interface 208 may incorporate the machine learning model 228 to deliver immediate and personalized feedback. For example, the system may analyze a user's incorrect response to a question and provide tailored hints or explanations based on patterns identified in similar mistakes. Continuing, the adaptive capability may help users address gaps in understanding and reinforces learning more effectively. The machine learning model 228 may also dynamically adjust the difficulty level of questions presented to the user. For instance, if a user consistently answers intermediate-level questions correctly, the system may introduce more advanced material to challenge their skills. Conversely, if a user struggles with specific concepts, the system may provide simpler, foundational questions to build confidence and comprehension. In another example, the machine learning model 228 may analyze the user's interaction history to recommend additional resources or practice materials. If the user shows repeated interest in topics like "calculus" or "contract law," the system may suggest further reading, interactive simulations, or quizzes that align with those interests, ensuring a highly targeted and personalized learning experience. Additionally and or alternatively, the machine learning model 228 may monitor user engagement data, such as the time spent on questions or skipped sections, to refine future outputs. For example, if a user frequently skips lengthy explanations, the system may summarize responses more concisely while still providing access to in-depth content when needed. This responsive approach ensures the system continuously adapts to the user's preferences and learning style.

With continued reference to FIG. 2, the machine learning model 224 may be embedded alongside the questions and study materials, actively analyzing the content displayed in the first visual window 208a to provide immediate clarification and contextual insights. For instance, without limitation, if the first visual window 208a presents a test question on Newton's Laws of Motion, the second visual window 208b may dynamically generate an explanation of the relevant law, highlight key principles, and offer additional resources such as diagrams or real-world examples. Continuing, if the student interacts with the material, by selecting a term, highlighting a passage, or submitting an attempt at answering a question, the machine learning model 224 may process that engagement and adjust its output in the second visual window 208b to provide tailored feedback. Without limitation, this may ensure that the user receives highly relevant assistance without needing to navigate away from their study session. In an embodiment, the machine learning model 224 may leverage multiple data sources within the GUI 208, enhancing the learning experience by incorporating context-aware assistance. The machine learning model 224 may analyze the personalized test preparation materials displayed in the first visual window 208a, recognize the user's responses to test questions, and even interpret notes, highlights, or annotations made by the user. For example, if a student highlights a section of a complex legal case in the study material, the machine learning model 224 may interpret this selection and generate a summary, key takeaways, or comparisons to similar cases within the second visual window. Additionally and or alternatively, if the student attempts to answer a practice question, the ML module may evaluate the response and offer targeted explanations, corrections, or hints to guide them toward the correct reasoning. Without limitation, this interactive and contextually responsive approach ensures that the apparatus adapts dynamically to the user's specific learning progress. Continuing, this configuration offers significant usability improvements over conventional learning platforms, where students typically need to search for explanations separately or reference external materials. Without limitation, by embedding the machine learning model 224 directly within the GUI 208, the apparatus provides on-demand support that is immediately relevant to the user's study session, reducing the need for manual searching and improving overall comprehension. This seamless integration of AI-driven assistance within the learning interface enhances engagement, allowing users to receive instant clarifications that are directly aligned with the material they are studying. The result is a more efficient, personalized, and interactive learning process, ensuring that users can focus on mastering the subject matter with minimal disruptions.

With continued reference to FIG. 2, in an embodiment, the graphical user interface 208 includes an output element 232. In an embodiment, the output element may display content generated by the machine learning model 228. For example, without limitation, the output element 232 may display curated study materials, problem sets, or test questions tailored to the user's learning needs.

With continued reference to FIG. 2, in a non-limiting example, the graphical user interface may be consistent with one or more aspects of the graphical user interface as described in U.S. patent application Ser. No. 19/044,241, filed on Feb. 3, 2025, titled "APPARATUS AND METHOD FOR GENERATING A LEARNING ENVIRONMENT COMPRISING AN INTERACTIVE, MULTI-WINDOW GRAPHICAL USER INTERFACE," which is incorporated by reference herein in its entirety.

Figure 3:
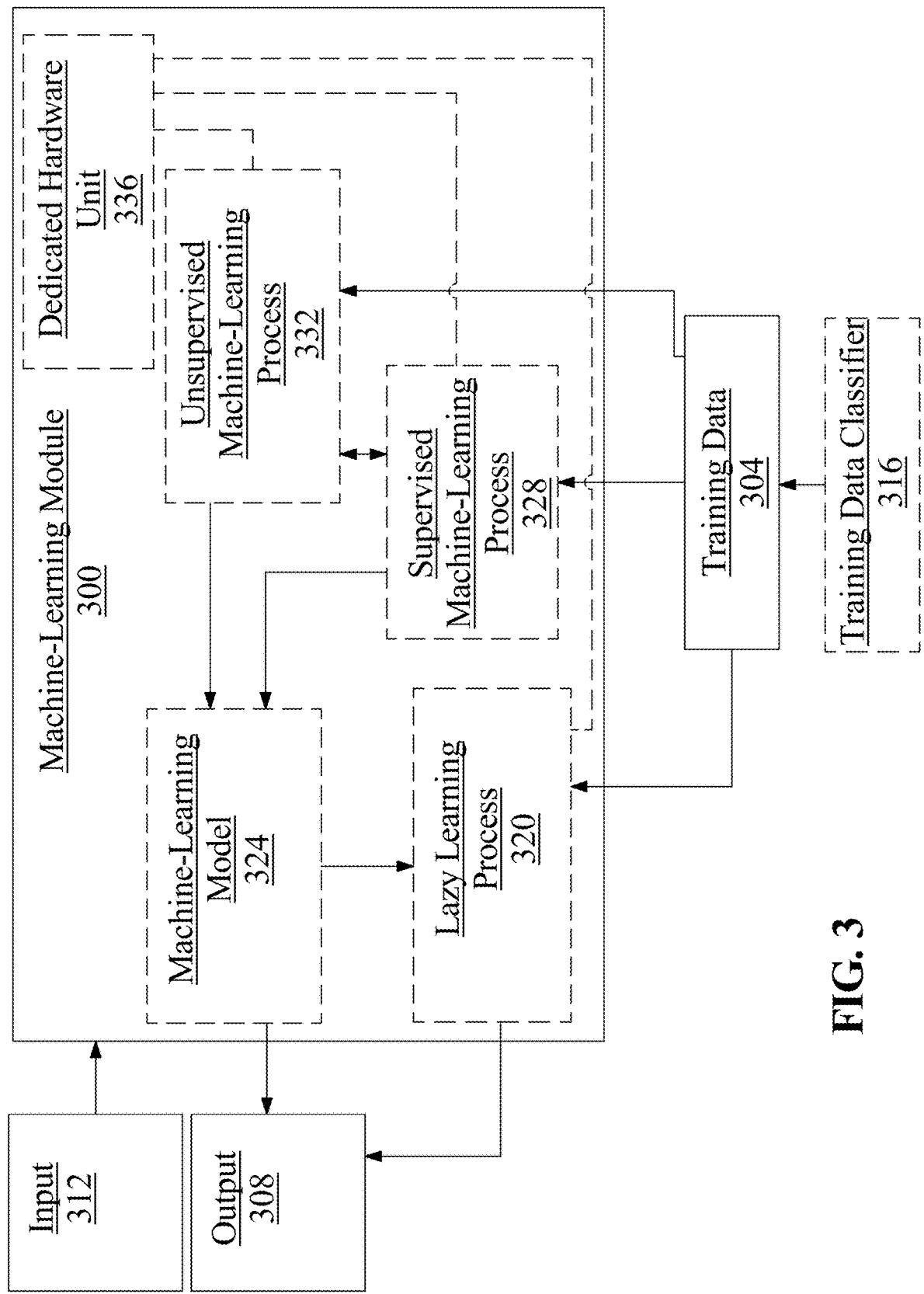
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs include input data and outputs include return output, one or more classifications, and user specific output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories that characterize a sub-population, such as a cohort of learners grouped by skill level (e.g., beginner, intermediate, or advanced) and/or other analyzed items and/or phenomena, such as preferred learning styles (e.g., visual, auditory, or kinesthetic) or subject areas (e.g., mathematics, science, or language arts), for which a subset of training data may be selected.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will IQR be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input data as described above as inputs, return output, one or more classifications, and user specific output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
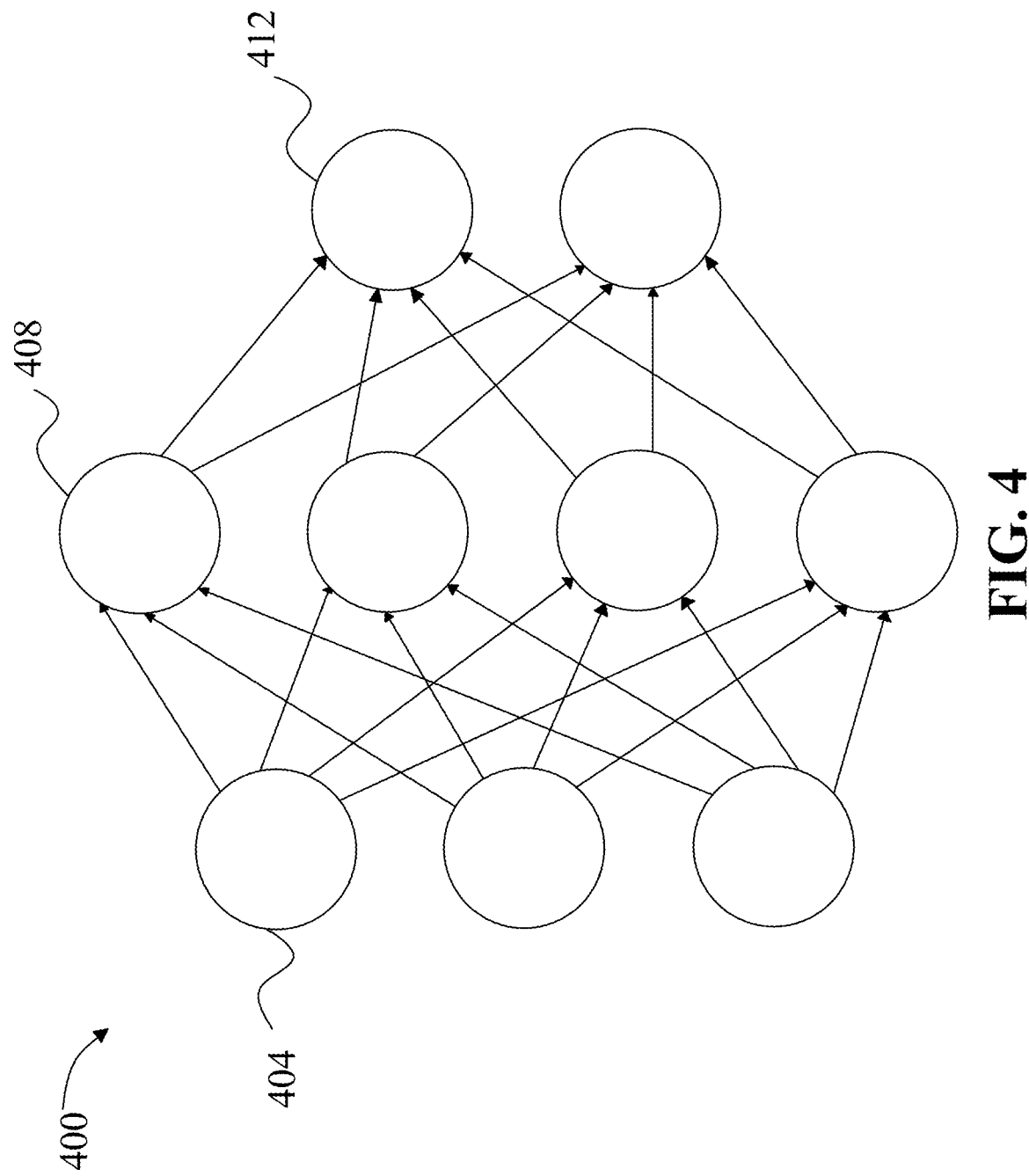
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
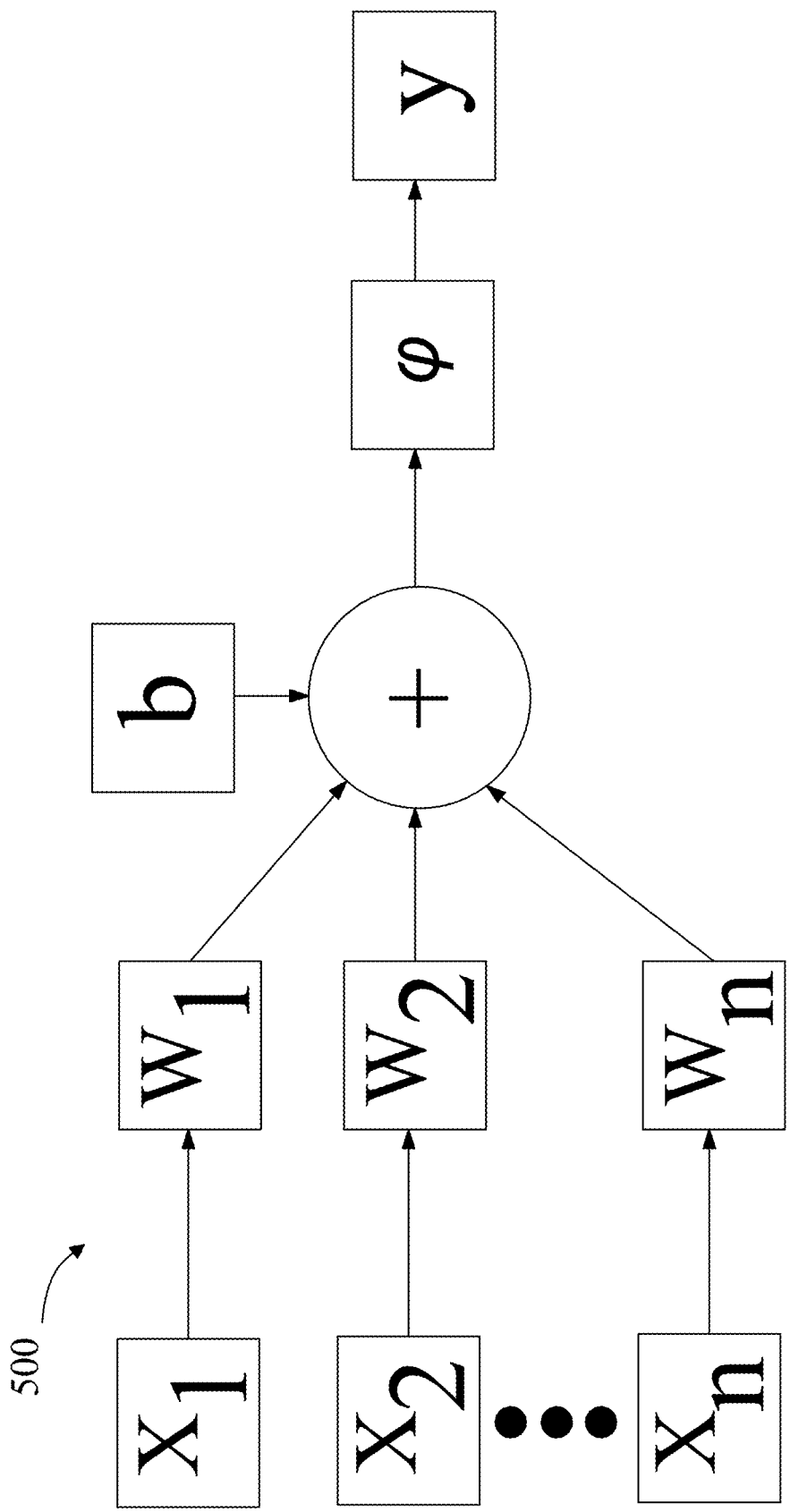
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given
input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
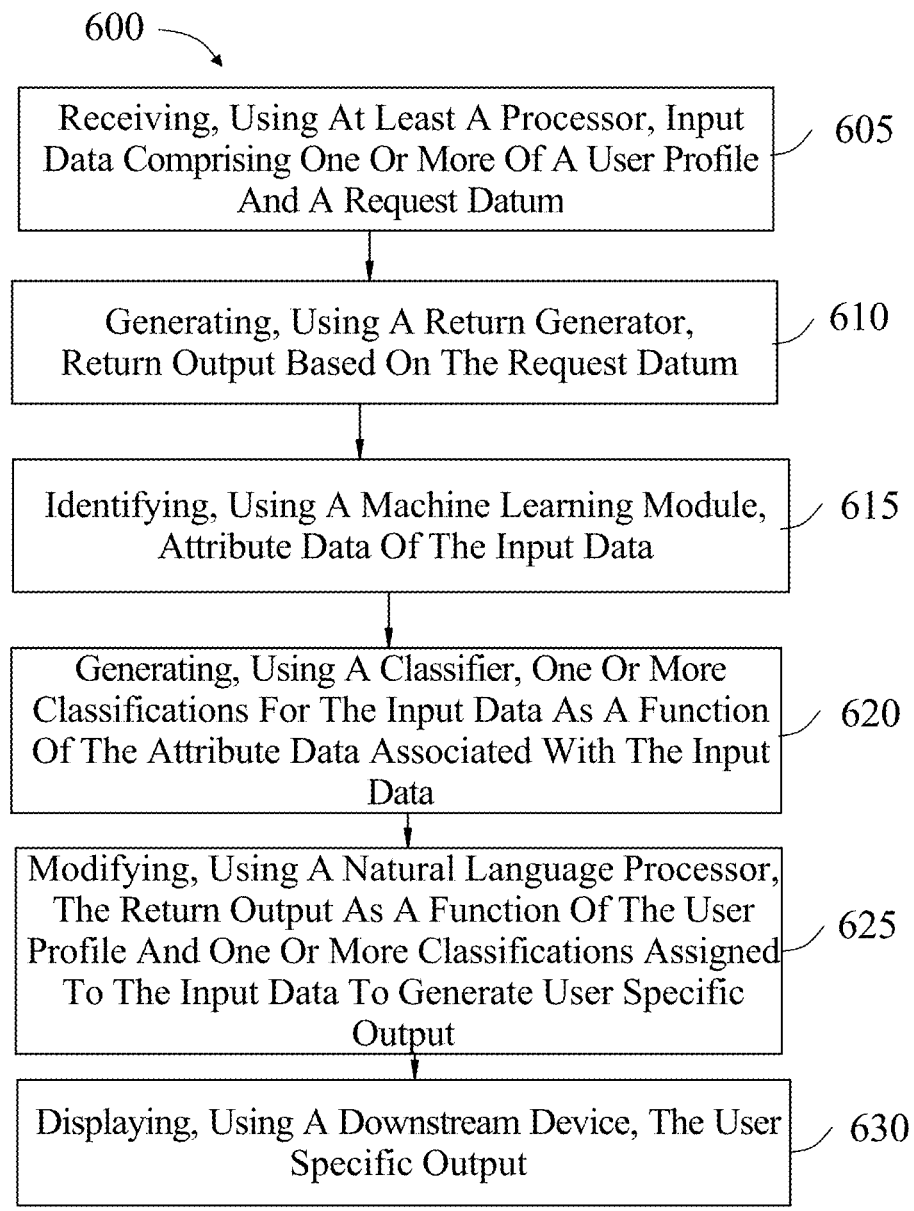
FIG. 6 is a block diagram of an exemplary method for personalization of educational machine learning models.

Referring now to FIG. 6, a flow diagram of an exemplary method 600 for personalization of educational machine learning models is illustrated. At step 605, method 600 includes receiving, using at least a processor, input data comprising one or more of a user profile and a request datum. This may be implemented as described and with reference to FIGS. 1-5.

Still referring to FIG. 6, at step 610, method 600 includes generating, using a return generator, return output based on the request datum. This may be implemented as described and with reference to FIGS. 1-5.

Still referring to FIG. 6, at step 615, method 600 includes identifying, using a machine learning module, attribute data of the input data. This may be implemented as described and with reference to FIGS. 1-5.

Still referring to FIG. 6, at step 620, method 600 includes generating, using a classifier, one or more classifications for the input data as a function of the attribute data associated with the input data. This may be implemented as described and with reference to FIGS. 1-5.

Still referring to FIG. 6, at step 625, method 600 includes modifying, using a natural language processor, the return output as a function of the user profile and one or more classifications assigned to the input data to generate user specific output. In an embodiment, the method further may include a second machine learning model, wherein the second machine learning model comprises a large language model, wherein the large language model is configured to provide, using a graphical user interface of the downstream device, dynamic clarification to the request datum. In an embodiment, the method may further be configured to generate, using the second machine learning model, an alternative user specific output as a function of the input data, wherein the input data comprises activity data. In an embodiment, the natural language processor may be further configured to adapt linguistic phrasing of the user specific output based on the attribute data, wherein the attribute data comprises demographic preferences extracted, using the at least a processor, from the user profile. This may be implemented as described and with reference to FIGS. 1-5.

Still referring to FIG. 6, at step 630, method 600 includes displaying, using a downstream device, the user specific output. In an embodiment, the method further may include an evaluation model, wherein the at least a processor is further configured to compare, using the evaluation model, historical classifications to future activity, determine, using a comparison of the historical classifications to the future activity, target classifications, generate a classification score as a function of a difference between the historical classifications and the target classifications, and iteratively train the classifier using the classification score. In an embodiment, the method may further include comparing, using the evaluation model, a historical user specific output with the future activity, determining, using a comparison of the historical user specific output with the future activity, a target user specific output, generating a user specific output score as a function of a difference between the historical user specific output and the future activity, and iteratively train the natural language processor using the user specific output score. In an embodiment, the evaluation model may be further configured to calculate a composite score as a function of integrating the classification score, the user specific output score, iteratively update the composite score based on user feedback received though an interactive element, and provide the composite score as training feedback for the classifier and the natural language processor. In an embodiment, the method may further include a database communicatively connected to the at least a processor, wherein the at least a processor is configured to store, using the database, one or more of historical input, historical classifications, historical user specific output, and historical scores. In an embodiment, displaying the user specific output may include using a graphical user interface of the downstream device further comprises displaying, using the graphical user interface, an interactive element. In an embodiment, the interactive element may be configured to receive user feedback regarding the user specific output, modify the user specific output based on the user feedback, and update the user profile using the user feedback. This may be implemented as described and with reference to FIGS. 1-5

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
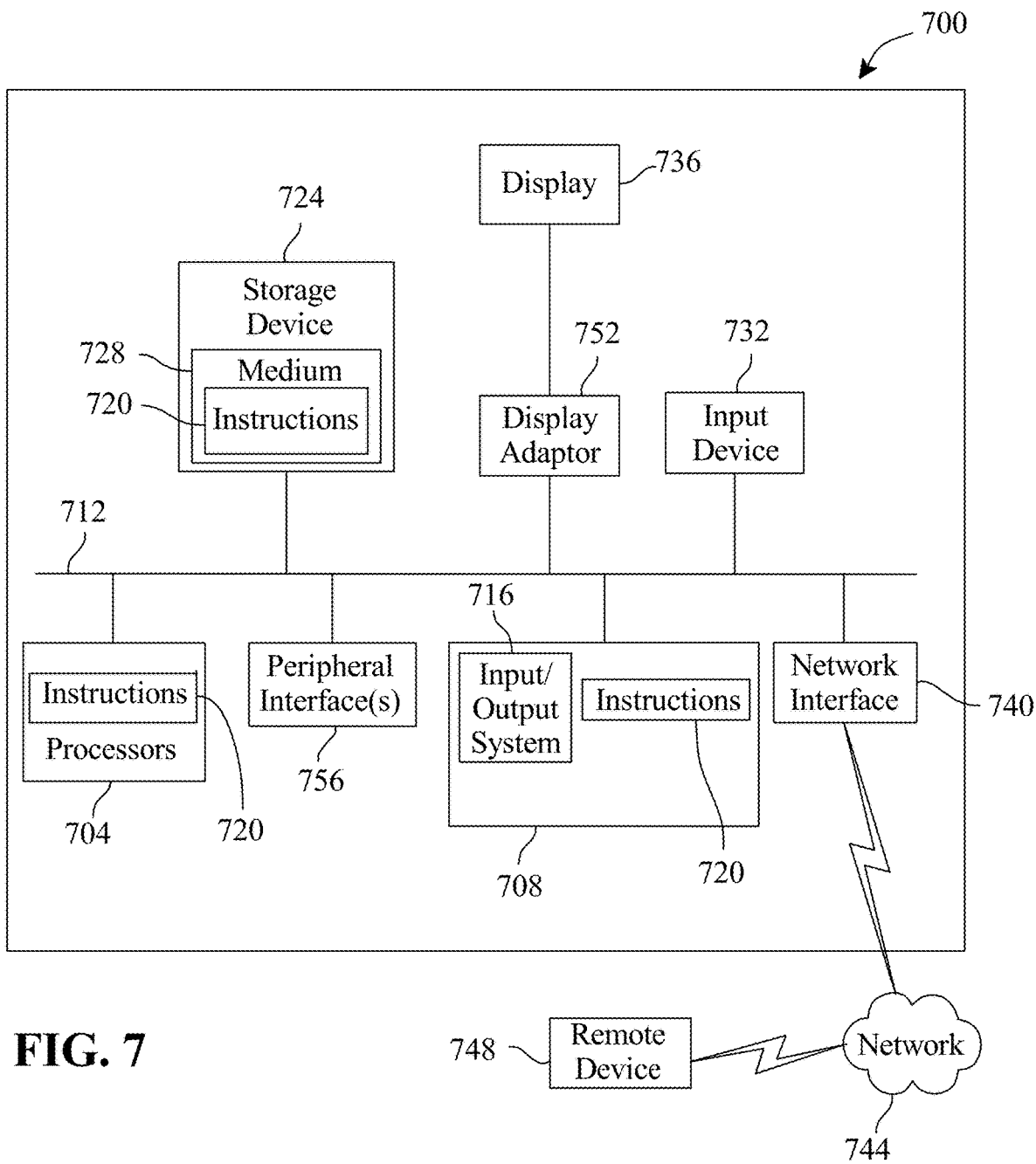
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for personalization of educational machine learning models, wherein the apparatus comprises:
   at least a computing device, wherein the computing device comprises:
      a memory; and
      at least a processor communicatively connected to the memory, wherein the memory contains instructions configuring the at least a processor to:

receive input data comprising one or more of a user profile and a request datum;

generate, using a return generator, return output based on the request datum;

identify, using a machine learning model, attribute data of the input data;

generate, using a classifier, one or more classifications for the input data as a function of the attribute data associated with the input data, wherein generating the one of more classification using the classifier comprises:

comparing, using an evaluation model, historical classifications to future activity;

determining, using a comparison of the historical classifications to the future activity, target classifications;

generating a classification score as a function of a difference between the historical classifications and the target classifications; and iteratively training the classifier using the classification score;

modify, using a natural language processor, the return output as a function of the user profile and one or more classifications assigned to the input data to generate user specific output;

display, using a downstream device, the user specific output.

2. The apparatus of claim 1, further configured to generate, using the machine learning model, an alternative user specific output as a function of the input data, wherein the input data comprises activity data.

3. The apparatus of claim 1, wherein the at least a processor is further configured to:

compare, using the evaluation model, a historical user specific output with the future activity;

determine, using a comparison of the historical user specific output with the future activity, a target user specific output;

generate a user specific output score as a function of a difference between the historical user specific output and the future activity; and iteratively train the natural language processor using the user specific output score.

4. The apparatus of claim 3, wherein the evaluation model is further configured to:

calculate a composite score as a function of integrating the classification score, the user specific output score;

iteratively update the composite score based on user feedback received though an interactive element; and provide the composite score as training feedback for the classifier and the natural language processor.

5. The apparatus of claim 1, further comprising a database communicatively connected to the at least a processor, wherein the at least a processor is configured to store, using the database, one or more of historical input, historical classifications, historical user specific output, and historical scores.

6. The apparatus of claim 1, wherein displaying the user specific output using a graphical user interface of the downstream device further comprises displaying, using the graphical user interface, an interactive element.

7. The apparatus of claim 6, wherein the interactive element is configured to:

receive user feedback regarding the user specific output;

modify the user specific output based on the user feedback; and update the user profile using the user feedback.

8. The apparatus of claim 1, wherein the natural language processor is further configured to adapt linguistic phrasing of the user specific output based on the attribute data, wherein the attribute data comprises demographic preferences extracted, using the at least a processor, from the user profile.

9. The apparatus of claim 1, wherein displaying the user specific output comprises generating a graphical user interface, wherein:

the graphical user interface comprises a first visual window arranged alongside a second visual window;

the first visual window comprises the user specific output; and the second visual window is configured to present the output of a second machine learning model, wherein the second machine learning model comprises a large language model, wherein the large language model is configured to provide, as output in the second visual window, dynamic clarification as a function of the request datum and the user specific output.

10. A method for personalization of educational machine learning models, wherein the method comprises:

receiving, using at least a processor, input data comprising one or more of a user profile and a request datum;

generating, using a return generator, return output based on the request datum;

identifying, using a machine learning model, attribute data of the input data;

generating, using a classifier, one or more classifications for the input data as a function of the attribute data associated with the input data, wherein generating the one of more classification using the classifier comprises:

comparing, using an evaluation model, historical classifications to future activity;

determining, using a comparison of the historical classifications to the future activity, target classifications;

generating a classification score as a function of a difference between the historical classifications and the target classifications; and iteratively training the classifier using the classification score;

modifying, using a natural language processor, the return output as a function of the user profile and one or more classifications assigned to the input data to generate user specific output; and displaying, using a downstream device, the user specific output.

11. The method of claim 10, further configured to generate, using the machine learning model, an alternative user specific output as a function of the input data, wherein the input data comprises activity data.

12. The method of claim 10, wherein the at least a processor is further configured to:

compare, using the evaluation model, a historical user specific output with the future activity;

determine, using a comparison of the historical user specific output with the future activity, a target user specific output;

generate a user specific output score as a function of a difference between the historical user specific output and the future activity; and iteratively train the natural language processor using the user specific output score.

13. The method of claim 12, wherein the evaluation model is further configured to:

calculate a composite score as a function of integrating the classification score, the user specific output score;
iteratively update the composite score based on user feedback received though an interactive element; and
provide the composite score as training feedback for the classifier and the natural language processor.

14. The method of claim 10, further comprising a database communicatively connected to the at least a processor, wherein the at least a processor is configured to store, using the database, one or more of historical input, historical classifications, historical user specific output, and historical scores.

15. The method of claim 10, wherein displaying the user specific output using a graphical user interface of the downstream device further comprises displaying, using the graphical user interface, an interactive element.

16. The method of claim 15, wherein the interactive element is configured to:

receive user feedback regarding the user specific output;
modify the user specific output based on the user feedback; and
update the user profile using the user feedback.

17. The method of claim 10, wherein the natural language processor is further configured to adapt linguistic phrasing of the user specific output based on the attribute data, wherein the attribute data comprises demographic preferences extracted, using the at least a processor, from the user profile.

18. The method of claim 10, further comprising a second machine learning model, wherein the second machine learning model comprises a large language model, wherein the large language model is configured to provide, using a graphical user interface of the downstream device, dynamic clarification to the request datum.

* * * * *